Aug. 6, 1940.  S. SORENSEN  2,210,189
VALVE
Filed May 29, 1939  2 Sheets-Sheet 2
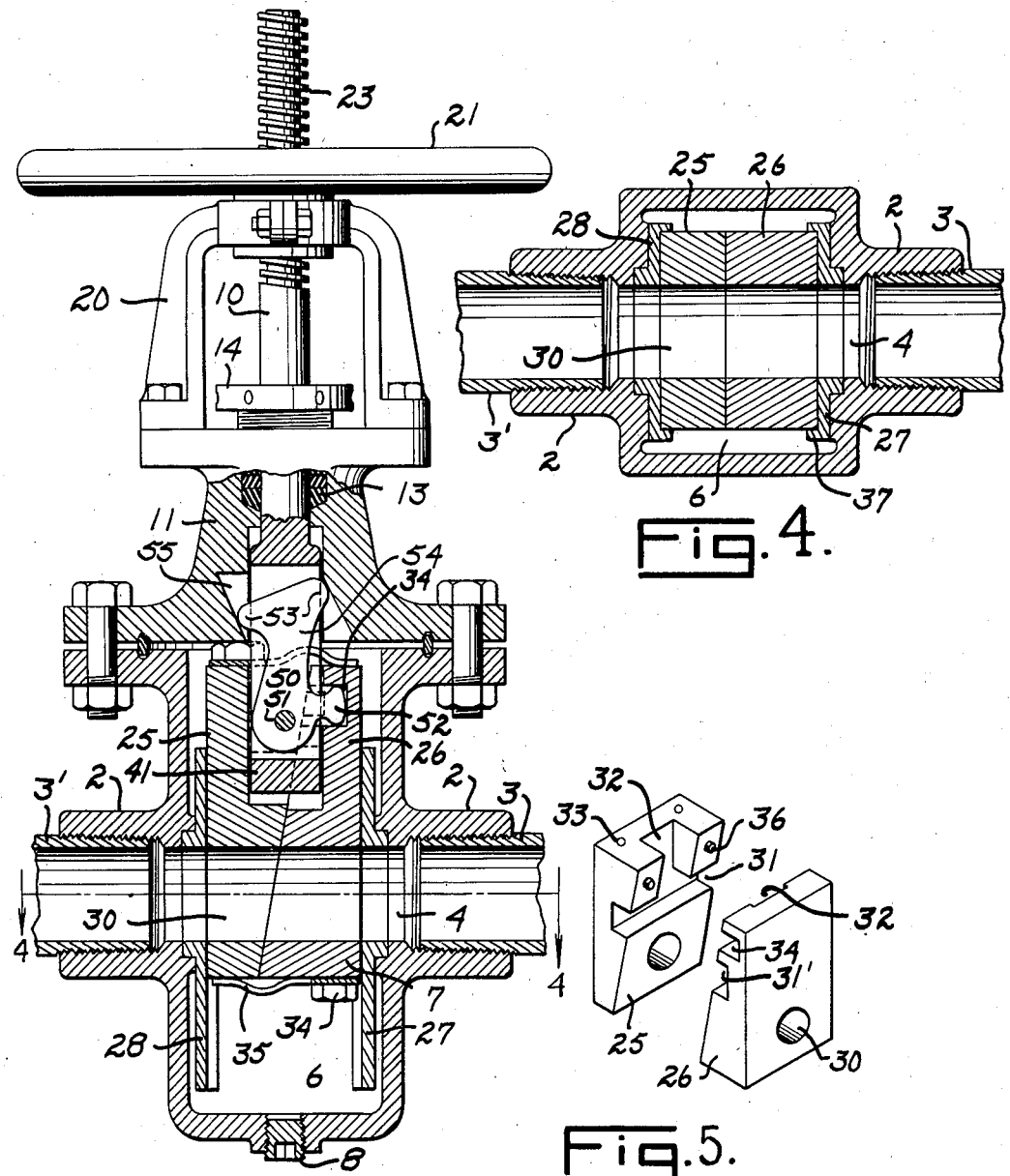
INVENTOR.
SAM SORENSEN
Jesse P. Stone
Lester D. Clark
ATTORNEYS

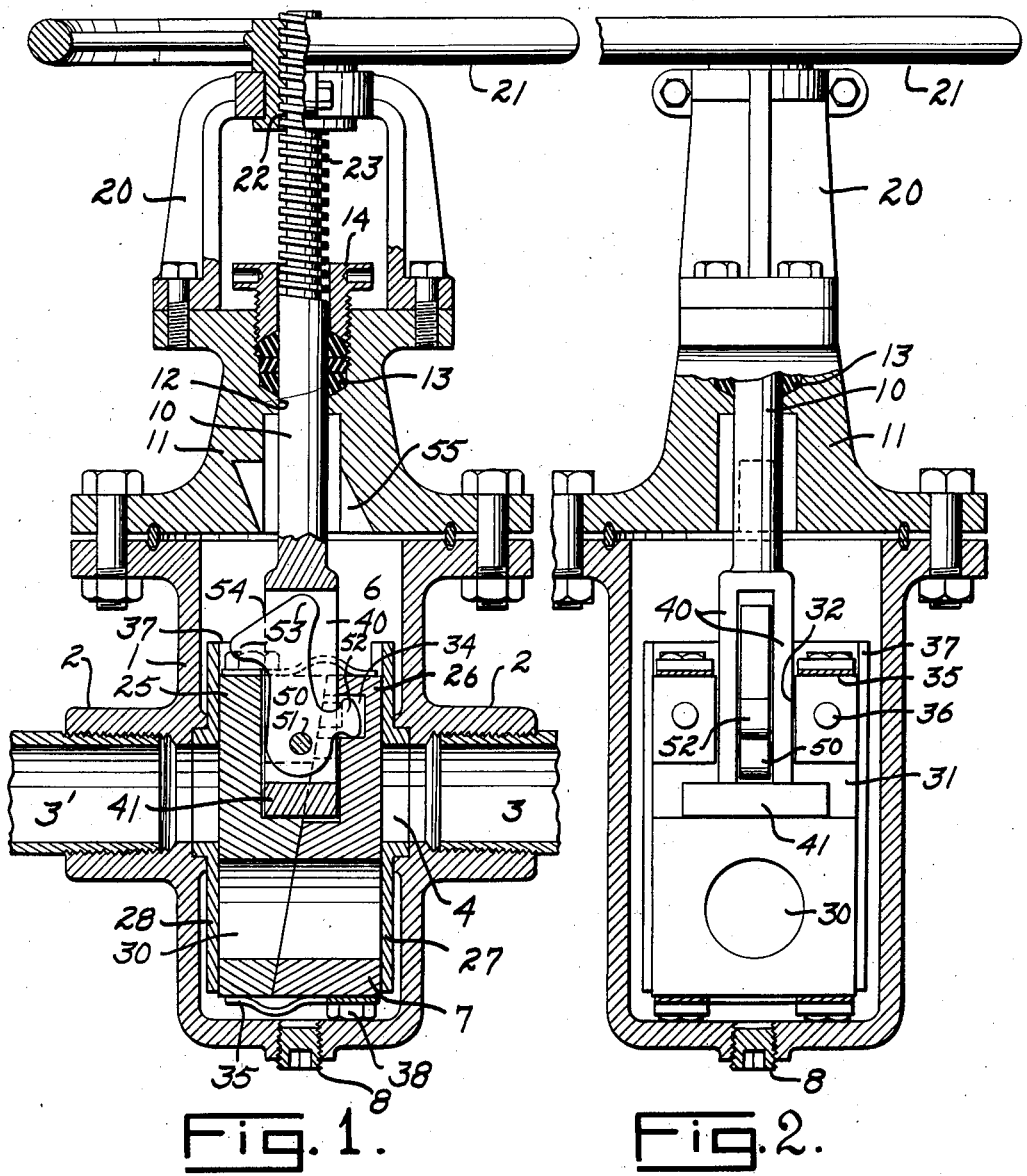

Patented Aug. 6, 1940

2,210,189

UNITED STATES PATENT OFFICE 2,210,189

VALVE

Sam Sorensen, Houston, Tex., assignor of fifty-five per cent to Howard F. Smith, Houston, Tex.

Application May 29, 1939, Serial No. 276,367

7 Claims. (Cl. 251—68)

The invention relates to valves and more particularly to the gate type of valves.

An object of the invention is to provide a gate valve wherein the gate member may be expanded into sealing engagement with opposed valve seats when the valve is in open or closed position.

Another object is to provide a valve having a gate comprising wedge sections which are normally urged toward biased position so that the valve is of contracted width during movement between open and closed position.

Another object is to provide connection between the valve stem and the valve which will have positive driving action to move the valve to and from closed position.

Another object is to provide a valve having a loose connection between the valve stem and the valve gate together with means associated with such assembly for engagement with the valve bonnet to positively move the gate sections to and from wedging position as the gate moves to and from terminal position.

Another object is to provide a valve assembly in which a bell crank lever is pivotally mounted within the stem and gate assembly, one arm of such lever engaging a valve section and the other arm engageable with the valve bonnet to positively move the sections relative to each other as the gate moves to and from terminal position.

These and other objects will be apparent from the following description taken in connection with the drawings in which:

Fig. 1 is a vertical section thru a valve embodying the invention.

Fig. 2 is a vertical section taken at right angles to that shown in Fig. 1, one of the wedge sections of the gate being omitted to illustrate the construction of the stem to gate connection.

Fig. 3 is a verical section thru the valve similar to that shown in Fig. 1 but showing the relative position of parts when the valve is in open position.

Fig. 4 is a sectional view taken on line 4—4 in Fig. 3.

Fig. 5 is a perspective view of the wedge sections of the gate shown in spaced parallel relation.

The improved construction of the present invention comprises a valve body 1 having bosses 2 to which upstream and downstream pipes 3 and 3′ are attached to provide a passage 4 for fluid thru the body. Within the body 1 is a gate chamber 6 which extends transversely of the passage 4 and within which the composite gate generally indicated as 7 is movable to open and close the passage. The gate 7 is moved by means of a valve stem 10 to effect opening and closing the passage 4 in a manner and in accordance with the construction to be more fully described.

The bonnet 11 is attached to the body 1 at its upper end and has a central opening 12 thru which the stem 10 passes. This opening is counterbored at its upper end to receive packing 13 and a gland 14 whereby a seal is formed which prevents the movement of fluid axially of the valve stem 10.

A yoke 20 secured to the upper end of the bonnet 11 carries a hand wheel 21 having a threaded axial opening 22 to engage the threaded upper portion 23 of the valve stem 10. It is believed apparent that the valve stem and gate assembly will be moved longitudinally of the chamber 6 upon rotation of the hand wheel 21.

An improved feature of the invention resides in the construction of the gate 7 and the associated connection of the gate to the valve stem 10 whereby the composite gate is made to function in a desired and improved manner.

The gate 7 comprises a pair of wedge sections 25 and 26 which have complementary inclined inner faces, the outer faces being substantially parallel for sliding movement between and sealing engagement with valve seat plates 27 and 28, one of which surrounds the passage 4 at each side of the chamber 6. The seat plates 27 and 28 may be flanged at their opposite sides at 37 whereby such plates also accurately guide the gate longitudinally of the chamber 6.

As best seen in Fig. 5 the gate members 25 and 26 have openings 30 which are brought into mating relation in the passage 4 as illustrated in Fig. 3 of the drawings where the valve is shown in open position. Above the openings 30 the wedge sections are provided with transverse inner grooves 31 and 31′, the latter of which is of slightly less width than the former. The gate members 25 and 26 are also provided with longitudinal groove 32 to receive the end of the valve stem 10 in a manner to be more fully described.

The wedge section 26 also has a groove 34, into which project guiding pins 36 on the wedge section 25, these pins serving to limit relative movement of the sections 25 and 26. The broader end of each of the wedge sections is provided with openings 33 to receive cap screws 34 which secure leaf springs 35 in place to exert a force longitudinally of the gate, tending to displace the sections 25 and 26 relative to each other in such direction that the transverse dimension of the gate 7 is reduced. Such reduction in the transverse dimension of the gate eliminates binding action of the gate with the seat plates 27 and 28 so that the gate will move freely between terminal positions.

The lower end of the valve stem 10 is bifurcated to present arms 40 which extend downwardly thru the groove 32 and terminate in a transverse block 41 in the groove 31. This block is secured to the lower end of the arms 40 in any suitable manner, such as by welding, but may be integral with the valve stem 10. It is to be noted that the block 41 is of lesser width than is the groove 31 whereby a loose connection is formed between the valve stem and the valve gate.

A bell crank lever 50 is pivotally mounted between the arms 40 upon the pivot 51. The arm 52 of this lever has a round enlargement which fits within the groove 34 so that any tilting of the lever tends to move the wedge section 26 relative to the valve stem. The other end or arm 54 of the lever 50 extends upwardly between the arms 40 of the valve stem and terminates in ears 53 which are of such configuration as to enter a groove 55 in the bonnet 11, the walls of this groove being of such configuration as to effect desired movement of the lever 50 as the valve gate moves to and from open position.

To assure long life and ease in operation of the device just described, the chamber 6 contains a lubricant which is introduced by removing the plug 8 at the lower end of the housing 1. Alternately of course the plug 8 may be replaced by a suitable valved grease nipple so that it is only necessary to apply a grease gun to replenish the supply of lubricant within the chamber 6.

The operation of the described construction is as follows: It will be assumed that the gate is in closed position as shown in Fig. 1, at which time the screw head 38 is in engagement with the bottom of the chamber 6. The wedge section 25 is held in wedging relation with the section 26 by virtue of downwardly applied force by the valve stem 10 thru the block 41 in engagement with the lower face of the groove 31 in section 25. The outer faces of the wedge sections 25 and 26 are therefore forced outwardly into sealing engagement with the seal plates 27 and 28 so that the passage 4 will be sealed against the movement of fluid in the valve from the pipe 3 to the pipe 3'.

In opening the valve the hand wheel 21 is turned so as to lift the valve stem 10 and the gate assembly. Initial movement of the valve stem will cause the block 41 to rise against the upper surface of the groove 31 and to effect lifting action thereon. Such lifting action will break the seal and lift the member 25 against the frictional force produced by fluid at the upstream opening to the valve. It seems apparent that this action will also effect such relative movement of the valve members that the valve assembly is retracted for easy, continued movement thereof.

While the leaf springs 35 tend to cause the wedge section 25 to move upwardly relative to the section 26 to break the sealing engagement with the seat, yet, as above described, the force exerted by the block 41 upon the upper shoulder of groove 31 is instrumental in performing this function. The primary function of the springs 35 is that of holding the sections 25 and 26 in predetermined relative position during travel. When the valve 7 is moving upwardly this position is such that the arm 54 of the bell crank lever 50 is directly beneath the groove 55 in the bonnet 11, the valve stem and gate assembly may thus move freely upwardly as the hand wheel 21 is rotated and the ears 53 on the arm 54 enter the groove 55 in the bonnet. The openings 30 in the wedge sections of the gate thus move substantially into alinement with each other and with the passage 4 in the valve housing.

The ears 53 on the arm 54 engage the walls of the groove 55 and the bell crank lever therefore moves in accordance with the configuration of these walls as the valve moves into terminal position. This action is positive, and the movement of the lever is such that the arm 52 moves the wedge section 26 upwardly to bring about desired wedging action so that the gate sections again sealably engage the seat plates 27 and 28 and the openings 30 in the two sections are brought into mating relation.

It is believed apparent that as the valve is moved from open position positive unseating action will again take place as the ears 53 move downwardly in engagement with the inner walls of the groove 55.

The construction embodying the invention as just described is effective in obtaining an effective seal between the gate and the seal plates when the valve is in open or closed position. At the same time the wedging action as the gate approaches or recedes from terminal position is positive whereby the desired relative position of parts is assured.

What is claimed is:

1. A valve comprising a housing having a transverse fluid passage and a valve chamber transversely of said passage, a sliding gate within said chamber, said gate comprising wedge sections having their outer faces engageable with opposed seat faces in the passage, a valve stem attached to the gate and movable longitudinally of said chamber, and a bell crank lever pivotally mounted on said valve stem, one arm of said lever engaging one of the wedges, the other arm being adapted to engage the housing to positively move the wedge sections to and from wedging relation as the gate moves to and from terminal position.

2. A valve comprising a housing having a transverse fluid passage and a valve chamber transversely of said passage, a sliding gate within said chamber, said gate comprising wedge sections having their outer faces engageable with opposed seat faces in the chamber, a valve stem attached to the gate and movable longitudinally of said chamber, a bell crank lever pivotally mounted on said valve stem, one arm of said lever engaging one of the wedges, the other arm being adapted to engage the housing to positively move the wedge sections to and from wedging relation as the gate moves to and from terminal position, and means resiliently urging the wedge sections to a relatively biased position so that the bell crank lever assumes a predetermined position for engagement with the housing during terminal travel of the valve.

3. A valve comprising a housing having a transverse fluid passage, a chamber transversely of said passage, a sliding gate within said chamber, said gate comprising opposed wedge sections having their outer faces in parallel planes, means for resiliently urging the wedges to retracted biased position, a transverse groove in said gate, a valve stem having a lost motion driving connection with the gate in said groove, and means in said valve for positively moving the wedges to and from wedging relation as the valve moves to and from open position.

4. A valve comprising a housing having a transverse fluid passage, a chamber transversely of said passage, a sliding gate within said chamber, said gate comprising opposed wedge sections having their outer faces in parallel planes, means for resiliently urging the wedges to retracted biased position, a transverse groove in said valve, a valve stem having a lost motion driving connection with the valve in said groove, and means in said valve for positively moving the wedges to and from wedging relation as the valve moves to and from open position, said last mentioned means comprising a bell crank lever having one arm engaging one of the wedges and the other arm engageable with the housing to guide the movement thereof.

5. A valve comprising, a housing having a transverse fluid passage and a valve chamber transversely of said passage, a sliding gate within said chamber, said gate comprising opposed longitudinally tapering valve wedges, a valve stem, a loose connection between said stem and said gate, and means operatively associated with said stem and engageable with the valve housing for positively moving the valve wedges relative to each other as the gate moves to and from terminal position.

6. A valve comprising, a housing having a transverse fluid passage, a valve chamber transversely of said passage, a valve within said chamber, said valve comprising opposed longitudinally tapering valve wedges, a valve stem having a loose connection with said wedges, a cam surface in said housing, and means pivoted on said stem and engageable with said cam surface to positively move the valve wedges relative to each other as the gate moves to and from terminal position.

7. In a valve the combination of a housing having a transverse fluid passage with parallel oppositely facing seats therein, a valve stem movable transversely of said passage, a valve gate movable between said seats and comprising a pair of relatively movable valve wedges, adapted to be wedged against the seats, a loose connection between said valve stem and said wedges, and means on the stem engageable with the housing for positively moving one of the valve wedges upon the other as the gate moves to and from terminal position.

SAM SORENSEN.